United States Patent [19]
Oros et al.

[11] Patent Number: 6,167,275
[45] Date of Patent: *Dec. 26, 2000

[54] METHOD AND APPARATUS FOR DETERMINING A LOCATION OF A COMMUNICATION UNIT IN A WIRELESS COMMUNICATION SYSTEM

[75] Inventors: Nicholas C. Oros, Schaumburg; Steven C. Jasper, Hoffman Estates; Mark A. Birchler, Roselle, all of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/992,062

[22] Filed: Dec. 17, 1997

[51] Int. Cl.⁷ .................................................. H04Q 7/20
[52] U.S. Cl. ..................... 455/456; 455/433; 342/450; 342/457
[58] Field of Search .................................. 455/456, 433, 455/440; 342/457, 450

[56] References Cited

U.S. PATENT DOCUMENTS

| | | | |
|---|---|---|---|
| 5,293,645 | 3/1994 | Sood ...................................... | 455/54.1 |
| 5,343,499 | 8/1994 | Jasper et al. .............................. | 375/39 |
| 5,416,712 | 5/1995 | Geier et al. .............................. | 364/450 |
| 5,675,344 | 10/1997 | Tong et al. ............................... | 342/457 |
| 5,758,288 | 5/1998 | Dunn et al. .............................. | 455/456 |
| 5,812,522 | 9/1998 | Lee et al. ................................ | 370/206 |
| 5,859,613 | 1/1999 | Otto ........................................ | 342/463 |
| 5,873,040 | 2/1999 | Dunn et al. .............................. | 455/456 |
| 5,884,215 | 3/1999 | Birchler et al. .......................... | 701/207 |
| 5,890,068 | 3/1999 | Fattouche et al. ....................... | 455/456 |
| 5,901,358 | 5/1999 | Petty et al. .............................. | 455/456 |
| 5,926,133 | 7/1999 | Green, Jr. ................................. | 342/363 |
| 5,933,114 | 8/1999 | Eizenhofer et al. .................... | 342/457 |
| 5,943,014 | 8/1999 | Gilhousen ............................... | 342/465 |
| 5,987,329 | 11/1999 | Yost et al. ............................... | 455/456 |

*Primary Examiner*—Nay Maung
*Assistant Examiner*—Joy Redmon
*Attorney, Agent, or Firm*—Daniel C. Crilly; Jeffrey K. Jacobs

[57] ABSTRACT

A wireless communication system (100) that includes a plurality of base sites (101–103) employs a method and apparatus for determining a location of a communication unit (107) in the system. Upon transmission of an information signal (109) by the communication unit, each of the base sites receives the transmitted information signal. A serving base site (e.g., 103) determines a stream of information symbols from the information signal, derives timing information based on the information signal and the stream of information symbols, and conveys the stream of information symbols preferably to at least two non-serving base sites (101–102). The non-serving base sites determine respective timing information based on the information signal received from the communication unit and the stream of information symbols received from the serving base site. The location of the communication unit is then determined by either a base site or a stand-alone processing device (105) based on the serving base site's and non-serving base site's timing information.

24 Claims, 6 Drawing Sheets

METHOD AND APPARATUS FOR DETERMINING A LOCATION OF A COMMUNICATION UNIT IN A WIRELESS COMMUNICATION SYSTEM

FIELD OF THE INVENTION

The present invention relates generally to communication systems and, in particular, to locating a communication unit in a wireless communication system.

BACKGROUND OF THE INVENTION

Wireless communication systems, such as cellular, trunked, or conventional radio communication systems, are known to comprise mobile radio communication units, such as in-car or hand-held radios or radiotelephones, and a fixed communication system infrastructure that includes a plurality of geographically-diverse base sites. Each base site typically provides communication service to the mobile units located in its respective service coverage area.

In the interest of public safety, the Federal Communication Commission has mandated that, by the year 2002, all existing cellular communication systems provide a means for determining the location of a mobile unit in the respective system to within 125 meters of the actual location of the unit for purposes of allowing emergency personal to quickly determine a person's location in the event that a person places an emergency 911 (E911) call in the system. Existing methods for determining location of a given mobile unit are known. One such approach requiring use of global positioning satellite (GPS) receivers in mobile communication units is described in U.S. Pat. No. 5,416,712 issued to Geier et al. However, such GPS receivers add significant cost to mobile/portable equipment and prohibitively add to the size and complexity of such equipment, particularly portable radios.

Another known approach for determining locations of mobile communication units is entirely infrastructure-based, thereby eliminating the need for GPS receivers in the mobile units. That is, the communication system infrastructure alone determines the mobile unit's location (typically using triangulation techniques) based on transmissions received from the mobile unit. With this approach, three base sites receive a mobile communication unit's transmission and estimate corresponding times of arrival for the transmission. Each of the three base sites then provides its respective time of arrival to a centralized location processor that determines the mobile unit's location using one of a plurality of known triangulation algorithms. The three base sites that receive the communication unit's transmission are typically the serving base site (i.e., the base site currently providing communication service to the mobile unit) and two non-serving base sites (typically two base sites that provide communication service to coverage areas adjacent to the coverage area served by the serving base site).

Upon receiving the mobile unit's transmission, which typically includes a fixed waveform, such as a synchronization waveform, that is unique to a particular mobile unit in the particular region of the system in which the mobile unit is currently operating, each of the three base sites independently computes a time of arrival estimate for the transmitted signal. The time of arrival is determined by performing a correlation between the transmitted signal and the fixed waveform. Such an approach works well in a digital communication system, such as the Global System for Mobile Communications (GSM), in which the synchronization waveform is unique to the mobile communication unit operating in a particular region of the system and is sufficiently long in duration to permit an accurate time of arrival of the transmitted signal to be determined.

However, in a digital communication system, such as the "iDEN" communication system that is commercially available from Motorola, Inc., that uses a time acquisition waveform that is not unique to a mobile communication unit operating in a particular region of the system, the above infrastructure-only-based location determining approach does not work well enough to meet the location accuracy requirements for wireless E911 systems imposed by the FCC because interference produced by other mobile communication units transmitting on the same frequency with the same time acquisition waveform can cause the time of arrival estimates determined by the base sites to be inaccurate.

Therefore, a need exists for an apparatus and method for determining location of a mobile communication unit in a communication system that does not require the use of a GPS receiver in the mobile unit and that will meet the location accuracy requirements for wireless E911 systems imposed by the FCC in digital communication systems that use time acquisition waveforms that are not unique to mobile communication units operating in particular regions of the system. Such a method and apparatus that permit a completely infrastructure-based location determination would be an improvement over the prior art.

DESCRIPTION OF A PREFERRED EMBODIMENT

Generally, the present invention encompasses a method and apparatus for determining a location of a communication unit in a communication system that includes a plurality of base sites. Upon transmission of an information signal by the communication unit, at least two of the base sites—one of which is the base site presently providing communication service to the communication unit (i.e., the serving base site)—receives the transmitted information signal. The serving base site determines a stream of information symbols from the received information signal, derives timing information based on the received information signal and the stream of information symbols, and conveys the stream of information symbols to at least one other (i.e., non-serving) base site (preferably to at least two non-serving base sites). The non-serving base sites determine their own respective timing information based on the information signal received from the communication unit and the stream of information symbols received from the serving base site. The location of the communication unit is then determined by either a base site or a centralized processing device based on the serving base site's and non-serving base sites' timing information. By determining communication unit location in this manner, the present invention provides a completely infrastructure-based mobile unit location determination that satisfies the FCC's requirement for location accuracy in wireless E911 systems, such as Motorola's iDEN system, that utilize a time acquisition waveform that is common to all mobile communication units in the system or, such as GSM, that utilize a time acquisition waveform that is unique to the mobile communication unit operating in a particular region of the system.

Figure 1:
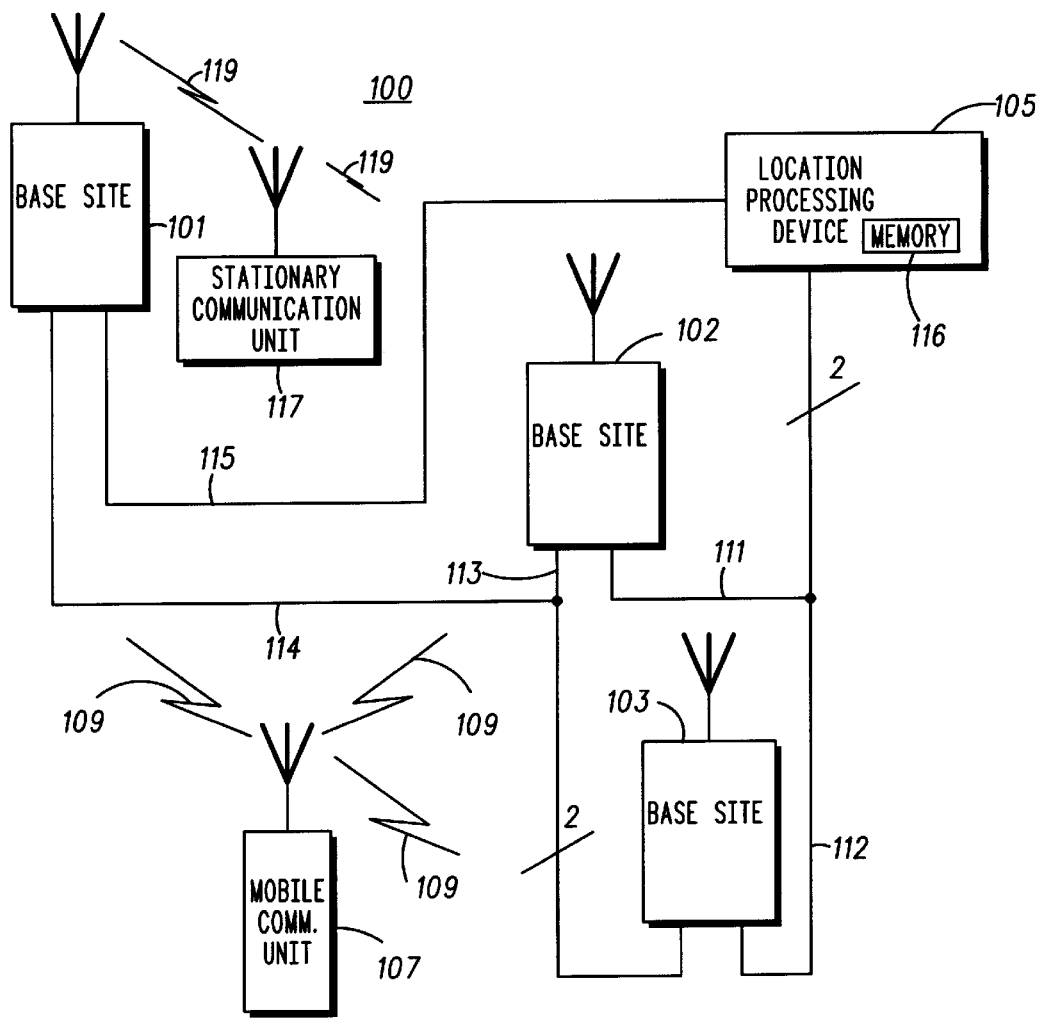
FIG. 1 illustrates a block diagram depiction of a wireless communication system in accordance with the present invention.

The present invention can be more fully understood with reference to FIGS. 1–10. FIG. 1 illustrates a block diagram depiction of a wireless communication system 100 in accordance with the present invention. The communication system 100 includes a plurality of base sites 101–103 (three shown), a location processing device 105, and at least one mobile communication unit 107. In a preferred embodiment, the communication system 100 comprises a digital, time division multiple access (TDMA) communication system, such as the "iDEN" communication system that is commercially available from Motorola, Inc. through its Land Mobile Products Sector located in Schaumburg, Ill. Accordingly, each base site 101–103 preferably comprises an "iDEN" Enhanced Base Transceiver Site (EBTS) and the communication unit 107 preferably comprises an "iDEN" mobile or portable radiotelephone. However, in an alternative embodiment, the communication system 100 might comprise any digital, multi-site communication system, including, but not limited to, systems that implement the following recognized standards: Global System for Mobile Communications (GSM), United States Digital Cellular (USDC), Personnel Communication Service (PCS), Association of Public Safety Communications Officials 25 (APCO 25), or Terrestrial Trunked Radio (TETRA).

The location processing device 105 preferably includes a read only memory (ROM) 116 for storing a computer program and a microprocessor to execute the stored computer program. However, in an alternative embodiment, the location processing device 105 might comprise a random access memory (RAM), a programmable read only memory (PROM), a diskette, a hard disk, a PCMCIA memory card, a logic circuit, a mass storage medium, an optical disk, a CD-ROM, a magnetic disk, or a digital versatile disk (DVD). The computer program stored in and executed by the location processing device 105 preferably performs the steps executed by the location processing device 105 in accordance with the present invention.

Operation of the communication system 100 occurs substantially as follows in accordance with the present invention. Subsequent to allocation of a communication channel to the communication unit 107 in accordance with known techniques (e.g., by a system controller (not shown), such as a base site controller (BSC)), the communication unit 107 transmits user information (data or voice) in the form of an information signal 109. In the preferred embodiment, the information signal 109 comprises a 16-ary quadrature amplitude modulated (QAM) signal. However, in an alternative embodiment, the information signal might comprise an alternative digital signal, such as a quaternary phase-shift keyed (QPSK) signal, a differential QPSK (DQPSK) signal, or an M-ary QAM signal (where M indicates the symbol set size).

The information signal 109 is received by multiple base sites 101–103. One of the base sites (e.g., base site 103) that receives the information signal 109 is the base site that has been selected to provide communication service to the communication unit 107. This base site 103 is known as the serving site. The other base sites 101, 102 that receive the information signal are considered non-serving sites. The selection of the serving base site 103 is typically made when the communication unit 107 registers with the communication system 100 (in particular with the communication system controller (not shown)) and is based on the quality of the inbound (communication unit-to-base site) registration signal transmitted by the communication unit 107 when the inbound registration signal is received by the base sites 101–103. The quality of the inbound registration signal is determined using any one of several known quality metrics, such as received signal strength (RSSI), bit error rate (BER), or carrier-to-interference plus noise ratio (C/(I+N)). The base site that determines the highest signal quality of the inbound registration signal is typically selected as the serving base site. Selection of serving sites in cellular-type communication systems is well-known; thus no further discussion of such selection will be presented.

Upon receiving the information signal 109, the serving base site 103 downconverts, filters, and samples the received signal 109 in accordance with known techniques to determine a stream of information symbols (e.g., QAM symbols) contained in the information signal 109. As is known, the information signal 109, once transmitted by the communication unit 107, includes not only transmitted information symbols, but also includes the effects of distortion, fading, noise, and interference that are inherently present in the wireless communication system 100. However, the serving base site 103 is generally selected as the base site measuring the best signal quality (e.g., C/(I+N)) of information signals transmitted by the communication unit 107. Therefore, when the serving site 103 receives the information signal 109 from the communication unit 107, the serving site 103 can use well-established techniques to identify and extract the transmitted information symbols from the collection of symbols, interference, noise, and distortion that constitutes the received signal.

In a preferred embodiment of the present invention, once the serving base site 103 determines the stream of information symbols present in the received information signal, the serving base site 103 conveys the stream of information symbols, in baseband form, to at least two of the non-serving base sites 101, 102 via respective communication links 113, 114, such as T1, microwave, fiber optic, or wireline communication links. In addition, the serving site 103 determines timing information based on the received information signal and the determined stream of information symbols. The timing information preferably comprises a time of arrival of the information signal, which, as is known, provides an indication of the current distance between the communication unit 107 and the serving base site 103. Determination of time of arrival of an information signal based on a pre-established symbol pattern, such as a pre-established synchronization symbol pattern, contained in the information signal is known as exemplified in U.S. Pat. No. 5,343,499 issued to Jasper et al. In U.S. Pat. No. 5,343,499, time of arrival is computed by performing a correlation between the pre-established synchronization symbol pattern and the received information signal. In the preferred embodiment of the present invention, the techniques described in U.S. Pat. No. 5,343,499 are used analogously to determine time of arrival of the information signal, wherein the synchronization pattern used in U.S. Pat. No. 5,343,499 is replaced with the symbol stream determined by the serving base site 103.

Upon receiving both the information signal 109 from the communication unit 107 and the stream of information symbols from the serving base site 103, each non-serving base site 101, 102 also determines respective timing information based on the received information signal and the stream of information symbols received from the serving base site 103 by preferably using the time-of-arrival determination technique discussed above. It should be noted that without the stream of information symbols received from the serving base site 103, the non-serving base sites 101, 102 would not be able to accurately determine timing information (e.g., time of arrival) on a consistent basis because the information signals received by the non-serving base sites 101, 102 are often subject to higher levels of interference and noise than is the information signal received by the serving base site 103. Streams of information symbols determined from information signals that are subject to high levels of interference and noise are more likely to include errors. Depending on the quantity and severity of the errors, both of which are difficult to predict, the timing information determined by the non-serving base sites based on their own computed streams of information symbols may be inaccurate or unattainable. Accordingly, in order to obtain consistently accurate timing information at each base site 101–103 used in the location determining process, the preferred embodiment of the present invention requires each base site 101–103 to use the stream of information symbols as determined by the serving base site 103 to compute respective timing information.

Once the base sites 101–103 determine their respective timing information, they preferably convey their timing information to the location processing device 105 via respective communication links 111, 112, 115. Similar to communication links 113 and 114, communication links 111, 112, and 115 may comprise T1, microwave, fiber optic, or wireline communication links. Upon receiving each base site's timing information, the location processing device 105 determines the location of the communication unit as the solution to a weighted least squares analysis applied to each base site's timing information and physical location. The physical location of each base site 101–103 is stored prior to system operation in the memory 116 of the location processing device 105. The weighted least squares technique preferably utilized to determine the location of the communication unit 107 is described in detail in U.S. Pat. No. 5,884,215 which is incorporated herein by reference. Computer simulation results have shown that, when using the preferred embodiment of the present invention, communication unit location can be determined to within 125 meters of the communication unit's actual location at least 67% of the time.

Having determined the communication unit's location, the location processing device 105 can convey the location to any appropriate target, such as police or fire personnel, in the event that the information signal 109 constitutes an emergency (e.g., 911) call. Although shown as a separate element of the communication system 100 in FIG. 1, one of ordinary skill will appreciate that the location processing device 105 may reside in any one of the base sites 101–103 or have its processing distributed among multiple entities (e.g., base sites 101–103).

In an alternative embodiment of the present invention, the determination of both base site timing information and location of the communication unit 107 is performed at the location processing device 105. In this case, the serving and non-serving base sites 101–103, upon receiving the information signal 109, provide their respective received information signals in baseband form to the location processing device 105. In addition, upon determining the stream of information symbols contained within the information signal 109 as described above, the serving base site 103 provides the stream of information symbols to the location processing device 105 instead of to the non-serving base sites 102, 103. The location processing device 105 then determines the timing information for each base site 101–103 using the time-of-arrival determination technique discussed above, and the location of the communication unit 107 as the solution to the aforementioned weighted least squares analysis. Accordingly, the location processing device 105 in this embodiment must include an apparatus for determining the timing information. Such an exemplary apparatus is shown in the location processing device 105 of FIG. 2.

In another alternative embodiment of the present invention, the communication system 100 further includes a stationary communication unit 117. The stationary communication unit 117 is similar to the mobile communication unit 107, except that it remains at a fixed location. During operation of the communication system 100, the stationary communication unit 117 transmits calibration signals 119 to the base sites 101–103. The calibration signals 119 preferably include a predetermined symbol set.

Upon receiving the calibration signals 119, the base sites 101–103 determine respective calibration information based on the calibration signals. The calibration information preferably comprises a timing offset to be applied to the respective base site's timing information, wherein the timing offset is determined by comparing the distance between the base site 101–103 and the stationary communication unit 117 as computed by the base site 101–103 to the actual distance between the base site 101–103 and the stationary communication unit 117. Given that distance can be calculated as the product of velocity and time, the timing offset (offset) can be calculated by dividing the difference between the actual distance ($d_{actual}$) between the base site 101–103 and the stationary communication unit 117 and the distance ($d_{computed}$) between the base site 101–103 and the stationary communication unit 117 as computed by the base site 101–103 by the speed of light (c)—i.e., offset=($d_{actual}$−$d_{computed}$)/C.

In addition to determining respective calibration information, the base sites 101–103 also determine their respective timing information as discussed above and provide both the timing information and the calibration information to the location processing device 105. The location processing device 105 then determines the location of the communication unit 107 as the solution to the aforementioned weighted least squares analysis. In this case, the timing information and the calibration information are inputs to the weighted least squares computation.

In yet another alternative embodiment of the present invention, only two base sites (one serving and the other non-serving) are necessary to determine the location of the communication unit 107. However, in this embodiment, the communication unit 107 must include an accurate time base (e.g., a global positioning satellite (GPS) receiver) and timestamp its transmission of the information signal 109. The base sites determine timing information in the manner described above and compute the time the information signal 109 took to travel between the communication unit 107 and the respective base site based on the timing information and the information signal's timestamp. The location processing device 105 then determines the distance between the communication unit 107 and each base site based on the determined information signal travel times and computes the location of the communication unit 107 based on such distances and the known locations of the base sites. Although possible, this embodiment is not preferred due to the aforementioned cost, size, and complexity issues of using a GPS receiver in a mobile communication unit.

Figure 2:
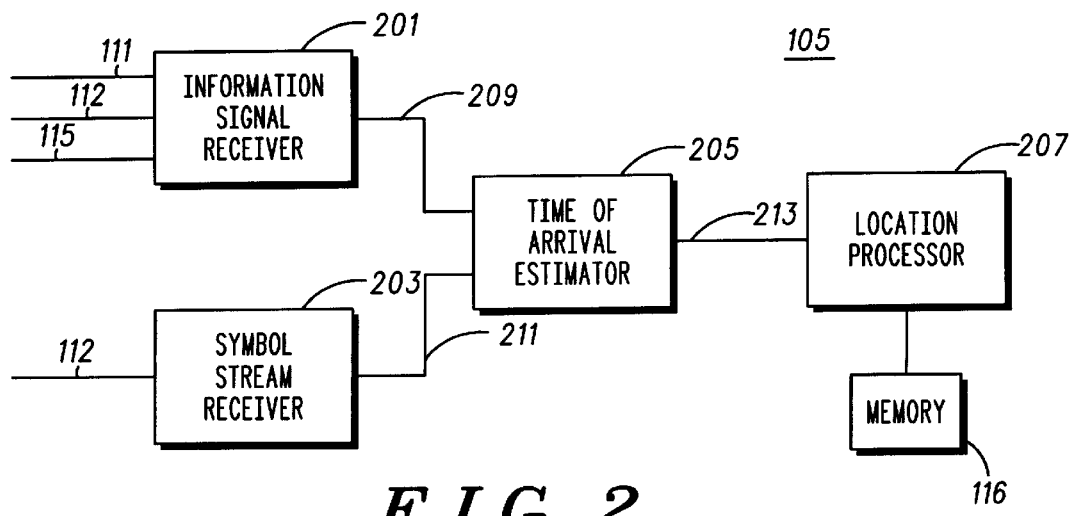
FIG. 2 illustrates a block diagram depiction of a location processing device in accordance with the present invention.

FIG. 2 illustrates a block diagram depiction of the location processing device 105 of FIG. 1 to implement the first alternative embodiment of the present invention discussed above. As mentioned above, the location processing device 105 may be a stand-alone device or be located within any one or more of the base sites 1011 103. The location processing device 105 includes an information signal receiver 201, a symbol stream receiver 203, a time of arrival estimator 205, and a location processor 207. The information signal receiver 201 is known and may comprise a modem, a fiber optic receiver, or any other device for receiving digital data. The symbol stream receiver 203 is also known and similarly may comprise a modem, a fiber optic receiver, or any other device for receiving digital data. In an alternative embodiment, the information signal receiver and the symbol stream receiver may be collocated within a microprocessor and be implemented by selectively outputting the information signal samples and the symbol stream to respective memory locations of the microprocessor. The time of arrival estimator 205 and the location processor 207 are preferably implemented as a computer program running on a microprocessor.

Operation of the alternative location processing device 105 occurs substantially as follows in accordance with the present invention. The information signal receiver 201 receives the baseband versions of the information signal 109 from the base sites 101–103 via their respective communication links 111, 112, 115 and provides the information signals 209 to the time of arrival estimator 205. The symbol stream receiver 203 receives the stream of information symbols from the serving base site 103 via its communication link 112 and provides the symbol stream 211 to the time of arrival estimator 205.

Upon receiving each information signal 209 and the serving base site's symbol stream 211, the time of arrival estimator 205 determines an approximate time of arrival for each information signal 209 using the time-of-arrival determination technique discussed above with regard to FIG. 1 and provides the time of arrivals 213 to the location processor 207. Upon receiving the time of arrivals 213 from the time of arrival estimator 205, the location processor 207 retrieves the actual locations of the base sites 101–103 from memory 116 and applies the aforementioned weighted least squares analysis to the time of arrivals 213 and the actual base site locations to determine the location of the communication unit as the solution to the analysis.

As described above, the present invention provides an infrastructure only-based approach for accurately determining the location of a mobile communication unit in a wireless communication system. By utilizing a preferred embodiment of the present invention, a location of a mobile communication unit can be determined within 125 meters of the actual location of the communication unit in accordance with the FCC's E911 requirements without requiring any software or hardware modifications to existing communication units. Moreover, by determining the transmitted symbols at the serving base site (i.e., the site providing the highest signal quality at the time of the transmission) and then sharing the detected symbols with the other non-serving base sites employed for the location determining process, the non-serving base sites can generate their own respective timing information (e.g., time of arrival) very accurately since they know, with a higher probability, which symbols were actually transmitted. Without such information, the timing information generated by the non-serving base sites would be prone to errors since their own determinations of the transmitted symbols are error-prone due to the high likelihood that the communication channels between the mobile communication unit and the non-serving base sites are of low signal quality.

Figure 3:
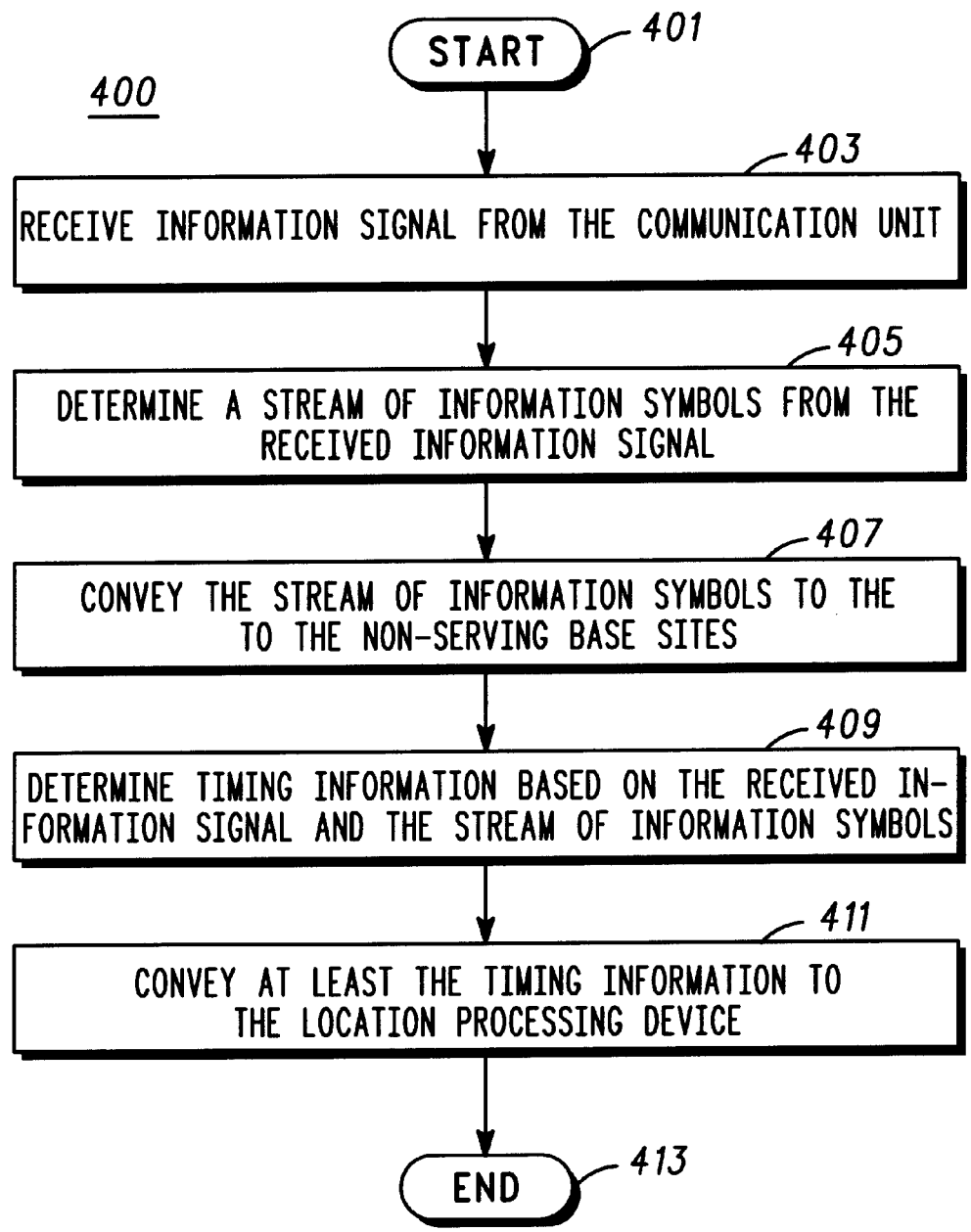
FIG. 3 illustrates a logic flow diagram of steps executed by a serving base site to aid in determining the location of a communication unit in accordance with a preferred embodiment of the present invention.

FIG. 3 illustrates a logic flow diagram 400 of steps executed by a serving base site to aid in determining the location of a communication unit in accordance with a preferred embodiment of the present invention. The logic flow begins (401) when the serving base site receives (403) an information signal from the communication unit. In the preferred embodiment, the information signal comprises a quadrature amplitude modulated signal conveyed in one or more time slots of a time division multiplexed (TDM) time frame. Accordingly, the information signal preferably includes a stream of information symbols transmitted via a radio communication channel at times selected by the TDMA system.

Upon receiving the information signal, the serving base site determines (405) the stream of information symbols present in the received information signal. This determination is well-known and includes sampling, demodulation, and filtering of the received information signal in accordance with well-established techniques.

Once the symbol stream has been determined, the serving base site conveys (407) the stream of information symbols to the non-serving base sites that are to be used in the location determining process and determines (409) timing information (e.g., time of arrival) based on the received information signal and the stream of information symbols. Upon determining the timing information, the serving site conveys (411) at least the timing information to a location processing device for determination of the communication unit's location, and the logic flow ends (413). As mentioned above, the location processing device may be a separate entity, may be located in one of the base sites, or may be distributed among multiple entities (e.g., base sites). As noted above and discussed in more detail below with regard to FIG. 6, the serving base site might convey additional information (e.g., calibration information or a signal quality estimate) to the location processing device to aid the location processing device in determining an accurate location of the communication unit.

Figure 4:
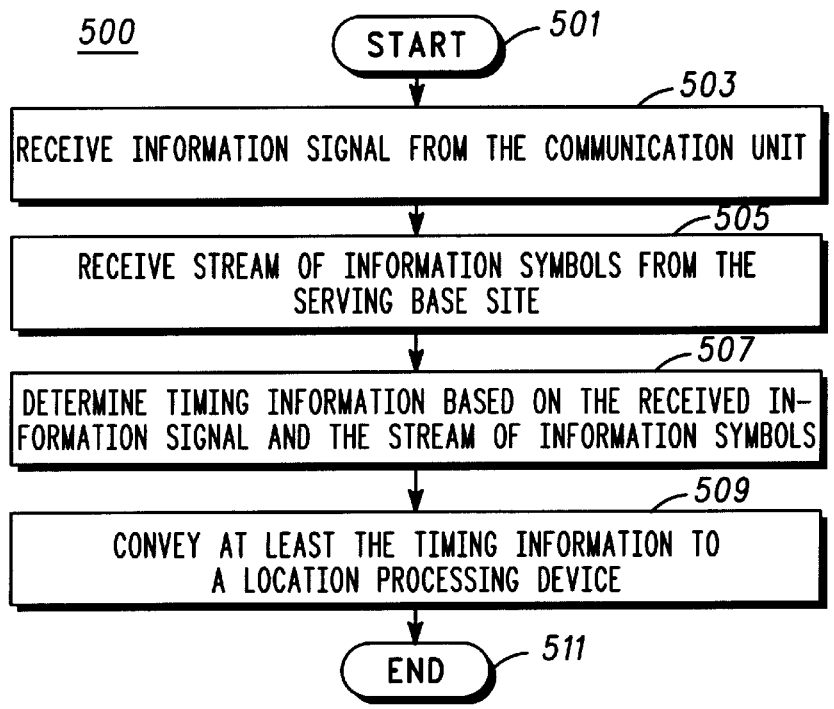
FIG. 4 illustrates a logic flow diagram of steps executed by a non-serving base site to aid in determining the location of a communication unit in accordance with the preferred embodiment of the present invention.

FIG. 4 illustrates a logic flow diagram 500 of steps executed by a non-serving base site to aid in determining the location of a communication unit in accordance with the preferred embodiment of the present invention. The logic flow begins (501) when the non-serving base site receives (503) the information signal from the communication unit. Typically, the information signal received by the non-serving base site will be of lower signal quality than is the information signal received at the serving base site. The non-serving base site also receives (505) the stream of information symbols from the serving base site.

Upon receiving the information signal from the communication unit and the stream of information symbols from the serving base site, the non-serving base site determines (507) timing information (e.g., time of arrival of the information signal) based on the received information signal and stream of information symbols. Once the timing information is determined, the non-serving site conveys (509) at least the timing information to a location processing device for determination of the communication unit's location, and the logic flow ends (511). As noted above and discussed in more detail below with regard to FIG. 6, the non-serving base site might convey additional information (e.g., calibration information or a signal quality estimate) to the location processing device to aid the location processing device in determining an accurate location of the communication unit.

Figure 5:
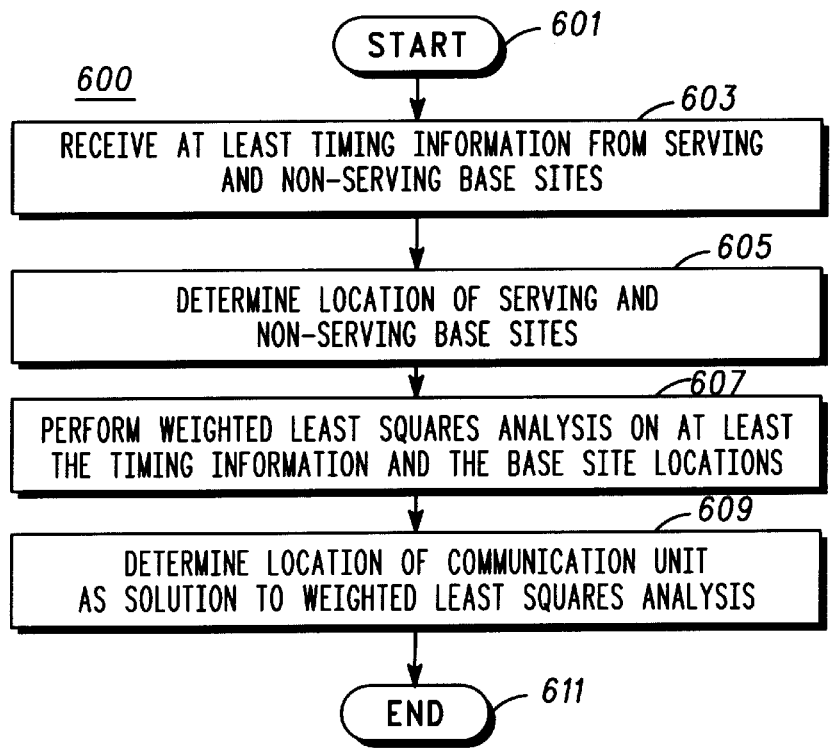
FIG. 5 illustrates a logic flow diagram of steps executed by a location processing device to determine the location of a communication unit in accordance with the preferred embodiment of the present invention.

FIG. 5 illustrates a logic flow diagram 600 of steps executed by a location determining device to determine the location of a communication unit in accordance with the preferred embodiment of the present invention. The logic flow begins (601) when the location processing device receives (603) timing information (and any other information, such as calibration information or signal quality estimates) from the serving base site and the non-serving base sites being used to aid in the determination of communication unit location. In the preferred embodiment, at least two non-serving base sites are selected from all the non-serving base sites to provide the timing information necessary to determine the communication unit's location. The selected non-serving base sites are preferably the non-serving base sites that receive the information signal and determine a received signal quality of the information signal that is greater than or equal to a quality threshold. For example, when the communication system utilizes C/(I+N) as the metric for evaluating signal quality, all non-serving base sites computing a C/(I+N) of greater than or equal to a threshold (e.g., 19 decibels (dB)) for the received information signal would be selected as the non-serving base sites for use in determining the location of the communication unit.

Upon receiving the timing information, the location processing device determines (605) the actual geographic location of the serving and non-serving base sites that provided the timing information to the location processing device by consulting a database within the location processing device. The geographic location of all the base sites in the communication system are preferably loaded into the database upon base site installation or upon addition of a base site to the system. Having received the timing information from the serving and non-serving base sites and obtained the geographic locations of the serving and non-serving base sites, the location processing device preferably performs (607) a weighted least squares analysis on the information received from the base sites (i.e., the timing information and any other information) and the base site locations. As discussed above, a detailed description of the weighted least squares analysis preferably utilized in the present invention can be found in U.S. Pat. No. 5,884,215. The location processing device then determines (609) the location of the communication unit as the solution to the weighted least squares analysis and the logic flow ends (611).

Figure 6:
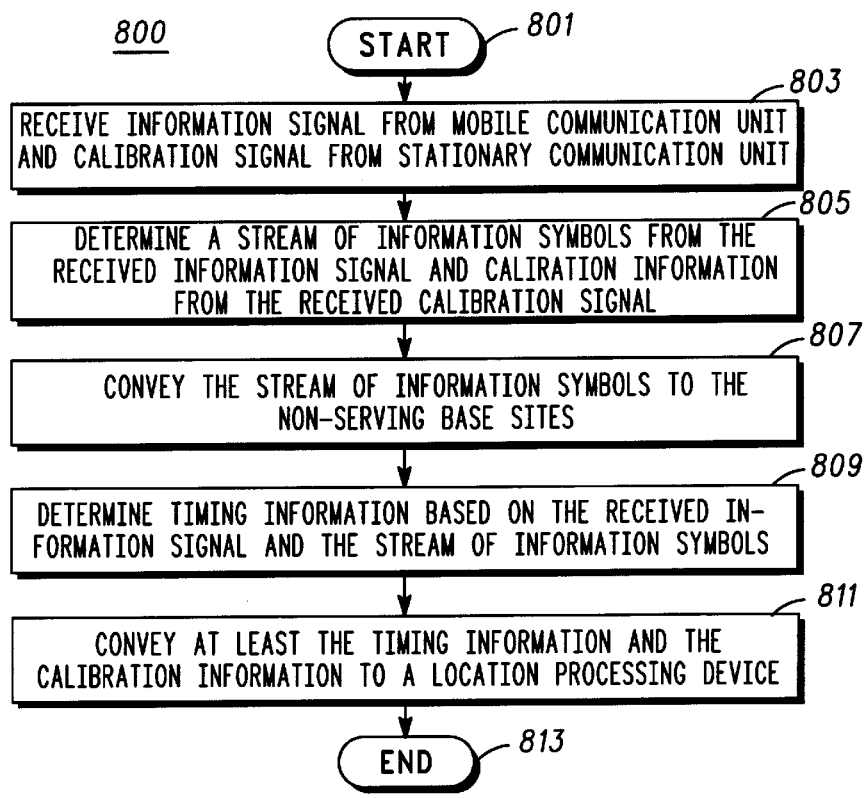
FIG. 6 illustrates a logic flow diagram of steps executed by a serving base site to aid in determining the location of a communication unit in accordance with an alternative embodiment of the present invention.

FIG. 6 illustrates a logic flow diagram 800 of steps executed by a serving base site to aid in determining the location of a mobile communication unit in accordance with an alternative embodiment of the present invention. The logic flow begins (801) when the serving base site receives (803) an information signal from the mobile communication unit and a calibration signal from a stationary communication unit. The calibration signal preferably comprises a known set of information symbols. The serving base site then determines (805) a stream of information symbols from the received information signal in accordance with known techniques. In addition, the serving base site determines (805) calibration information (e.g., a timing offset to be applied to the serving base site's timing information) from the received calibration signal by comparing the distance between the serving base site and the stationary communication unit as computed by the serving base site to the actual distance between the serving base site and the stationary communication unit.

Upon determining the stream of information symbols, the serving base site conveys (807) the stream of information symbols to the non-serving base sites being used to facilitate the determination of the mobile communication unit's location to permit the non-serving base sites to determine timing information for the information signals received by them from the mobile communication unit. In addition, the serving base site determines (809) its own timing information (e.g., time of arrival) based on the received information signal and the stream of information symbols in accordance with the time-of-arrival determination technique discussed above with regard to FIG. 1. Once the timing information is determined, the serving base site conveys (811) at least the timing information and the calibration information to a location processing device for use in determining the location of the mobile communication unit, and the logic flow ends (813). In addition to the timing and calibration information, the serving base site might also convey other information, such as a received signal quality estimate for the information signal, to the location processing device to aid the location processing device in determining an even more accurate location of the communication unit.

Figure 7:
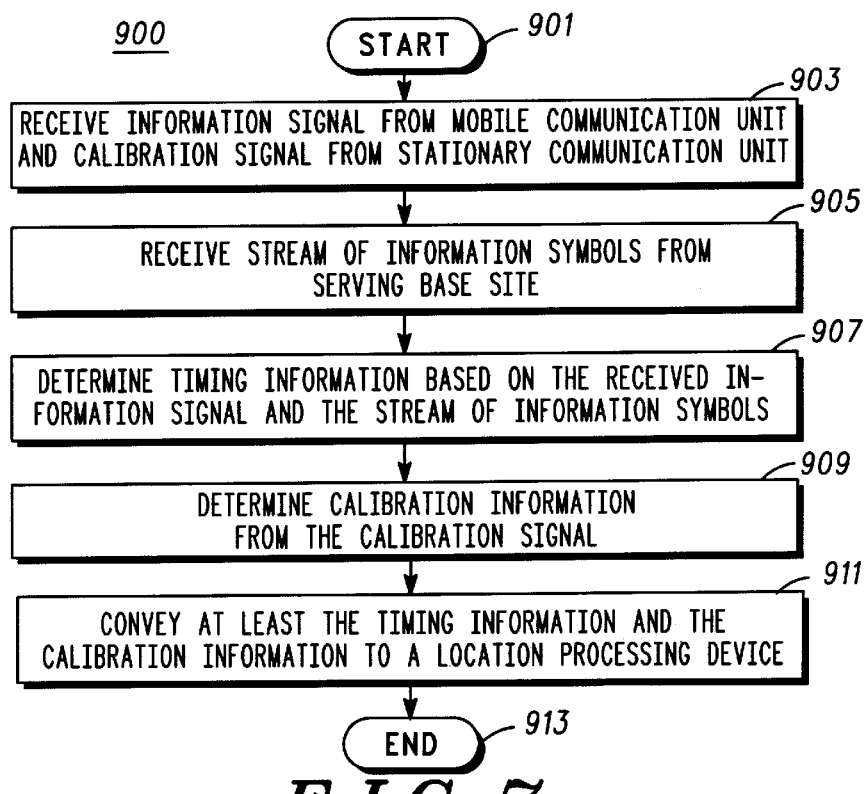
FIG. 7 illustrates a logic flow diagram of steps executed by a non-serving base site to aid in determining the location of a communication unit in accordance with the alternative embodiment of FIG. 6.

FIG. 7 illustrates a logic flow diagram 900 of steps executed by a non-serving base site to aid in determining the location of a mobile communication unit in accordance with the alternative embodiment discussed above with regard to FIG. 6. The logic flow begins (901) when the non-serving base site receives (903) an information signal from the mobile communication unit and a calibration signal from a stationary communication unit. As discussed above with regard to FIG. 6, the calibration signal preferably comprises a known set of information symbols. The non-serving base site also receives (905) a stream of information symbols from the serving base site. The received stream of information symbols comprises estimates of the actual information symbols contained in the information signal. However, the estimated information symbols determined by the serving base site have a higher probability of being the actual information symbols transmitted by the communication unit than do information symbols determined by the non-serving base sites because the quality of the communication path between the communication unit and the serving base site is typically better than the qualities of the communication paths between the communication unit and the non-serving base sites.

Upon receiving the information signal and the stream of information signals, the non-serving base site determines (907) timing information (e.g., time of arrival of the information signal) based on the received information signal and the stream of information symbols. The timing information is preferably determined in accordance with the time-of-arrival determination technique discussed above with regard to FIG. 1. In addition to determining timing information, the non-serving base site also determines (909) calibration information (e.g., a timing offset to be applied to the non-serving base site's timing information) from the received calibration signal by comparing the distance between the non-serving base site and the stationary communication unit as computed by the non-serving base site to the actual distance between the non-serving base site and the stationary communication unit.

Once the timing information and calibration information are determined, the non-serving base site conveys (911) at least the timing information and the calibration information to a location processing device for use in determining the location of the mobile communication unit, and the logic flow ends (913). In addition to the timing and calibration information, the non-serving base site might also convey other information, such as a signal quality estimate of the received information signal, to the location processing device to aid the location processing device in determining an even more accurate location of the communication unit.

Figure 8:
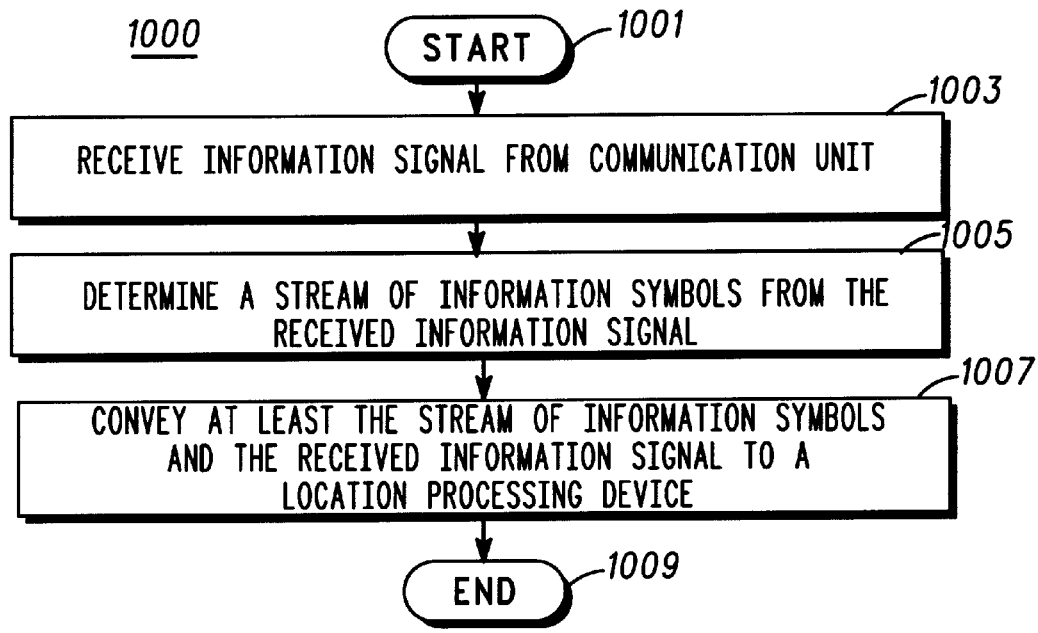
FIG. 8 illustrates a logic flow diagram of steps executed by a serving base site to aid in determining the location of a communication unit in accordance with another alternative embodiment of the present invention.

FIG. 8 illustrates a logic flow diagram 1000 of steps executed by a serving base site to aid in determining the location of a communication unit in accordance with another alternative embodiment of the present invention. The logic flow begins (1001) when the serving base site receives (1003) an information signal from the communication unit. The serving base site then determines (1005) a stream of information symbols from the information signal as discussed above. Upon determining the stream of information symbols, the serving base site conveys (1007) at least the stream of information symbols and the received information signal to a location processing device, and the logic flow ends (1009). In addition to the stream of information symbols and the received information signal, the serving base site might also convey other information, such as a signal quality estimate, to the location processing device to aid the location processing device in determining an even more accurate location of the communication unit. The location processing device then, as discussed below with regard to FIG. 10, uses the information conveyed by the serving base site to ultimately determine the location of the communication unit.

Figure 9:
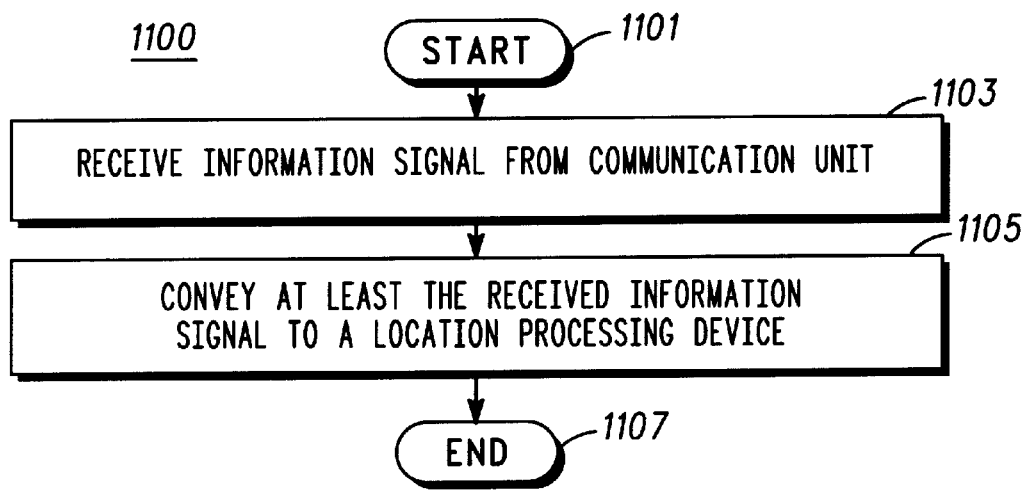
FIG. 9 illustrates a logic flow diagram of steps executed by a non-serving base site to aid in determining the location of a communication unit in accordance with the alternative embodiment of FIG. 8.

FIG. 9 illustrates a logic flow diagram 1100 of steps executed by a non-serving base site to aid in determining the location of a communication unit in accordance with the alternative embodiment of the present invention discussed above with regard to FIG. 8. The logic flow begins (1101) when the non-serving base site receives (1103) an information signal from the communication unit. The non-serving base site then conveys (1105) at least the received information signal to a location processing device, and the logic flow ends (1107). In addition to the received information signal, the non-serving base site might also convey other information, such as a signal quality estimate, to the location processing device to aid the location processing device in determining an even more accurate location of the communication unit. The location processing device then, as discussed below with regard to FIG. 10, uses the received information signal and any other information conveyed by the non-serving base site to ultimately determine the location of the communication unit.

Figure 10:
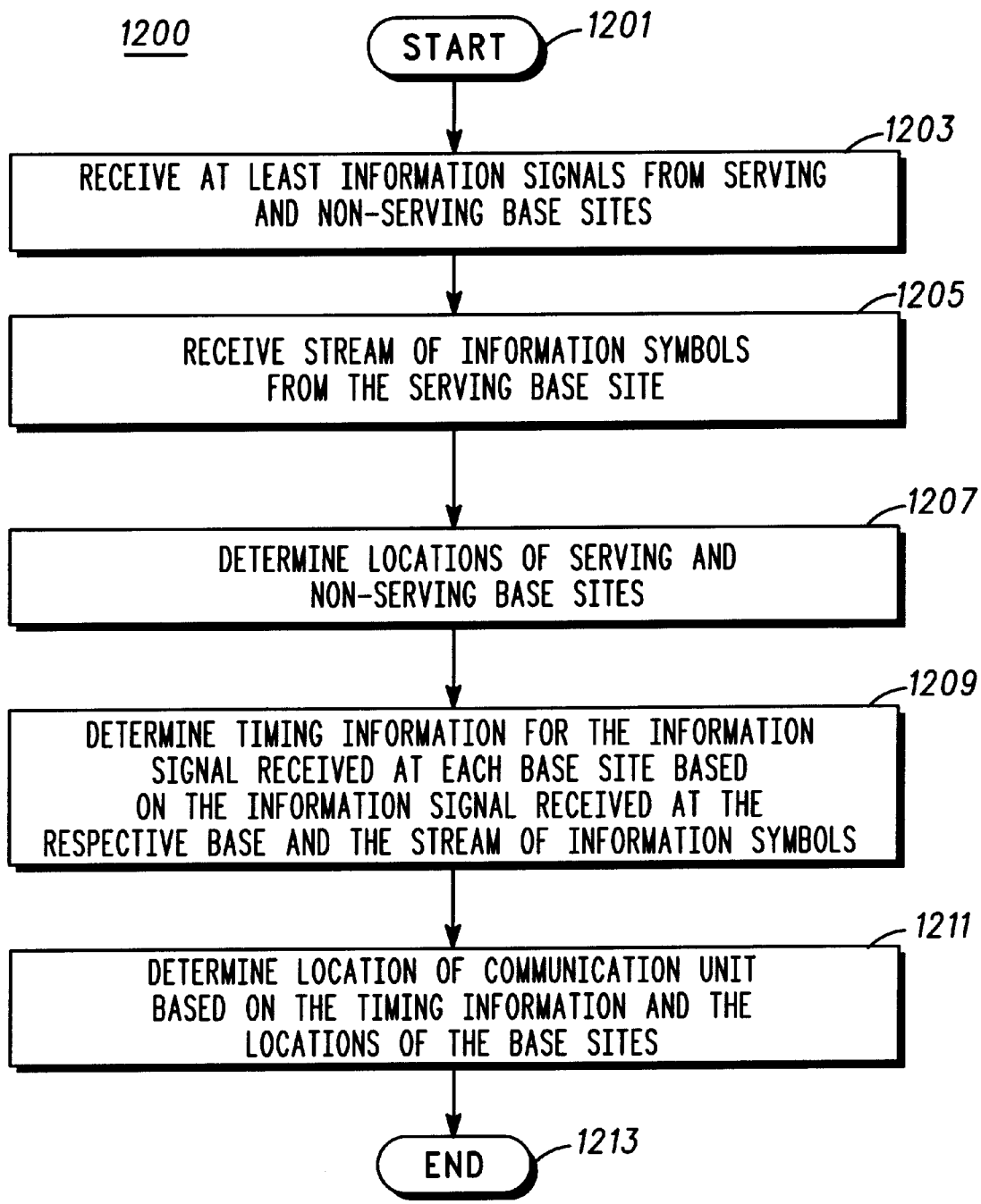
FIG. 10 illustrates a logic flow diagram of steps executed by a location processing device to determine the location of a communication unit in accordance with the alternative embodiment of FIGS. 8 and 9.

FIG. 10 illustrates a logic flow diagram 1200 of steps executed by a location processing device to determine the location of a communication unit in accordance with the alternative embodiment of the present invention discussed above with regard to FIGS. 8 and 9. The logic flow begins (1201) when the location processing device receives (1203) information signals from the serving base site and the non-serving base sites being employed to facilitate the location determination. As discussed above, the non-serving base sites selected to be used in the location determination process preferably comprise at least two base sites that receive the information signal and determine a received signal quality of the information signal that is greater than or equal to a quality threshold. In addition to the information signals, the location processing device also receives (1205) the stream of information symbols from the serving base site. The location processing device might also receive other information, such as calibration information and signal quality estimates, from the base sites that can be used to aid in the determination of the communication unit's location.

Upon receiving the information signals, the stream of information symbols, and any other information from the base sites, the location processing device determines (1207) the geographic locations of the serving and non-serving base sites by querying a database within the location processing device. The database is preferably loaded with base site locations upon installation of the base sites. Once the base site locations are determined, the location processing device determines (1209) timing information for the information signal received at each base site based on the information signal received from respective base site and the stream of information symbols. The determination of the timing information is preferably performed by estimating a time of arrival for each information signal using a technique analogous to the time-of-arrival approach described in U.S. Pat. No. 5,343,499. For example, if three information signals are provided by the serving and non-serving base sites (one information signal from the serving base site and the other two information signals from two non-serving base sites), the location processing device would perform the time-of-arrival determination three times, once for each information signal.

Once the timing information is determined, the location processing device determines (1211) the location of the communication unit based at least on the timing information and the locations of the base sites, and the logic flow ends (1213). As discussed above, the location processing device utilizes a weighted least squares analysis, such as the analysis described in U.S. Pat. No. 5,884,215 to determine the location of the communication unit. The inputs to the weighted least squares analysis are the timing information (e.g., time of arrivals), the locations of the base sites, and any other information received from the base sites that may be helpful in determining location, such as calibration information and signal quality estimates.

The present invention encompasses a method and apparatus for determining location of a communication unit in a wireless communication system. With this invention, the communication unit's location can be determined accurately via modifications to the system infrastructure only. By not requiring modifications to the mobile communication units, existing communication units can be located just as easily as newly manufactured communication units, thereby rendering the present invention extremely desirable for existing systems. In addition, the present invention does accommodate new communication units that employ highly technical and costly functionality, such as GPS receivers, but does not require the use of such functionality as do some prior art location-determining methods.

To achieve accurate times of arrival for the information signal transmitted by the mobile communication unit, the present invention, in the preferred embodiment, employs the serving base site to distribute the stream of information symbols contained in the information signal to the non-serving base sites that will be used in the location determination process. By using the stream of information symbols as determined by the serving base site, the non-serving base sites determine more accurate times of arrival than if they rely upon their own determination of the stream of information symbols contained in the information signal because the radio communication channel between the mobile communication unit and the serving base site is of higher quality than are the radio communication channels between the mobile communication unit and the non-serving base sites. Because the probability is greater that the stream of information symbols determined by the serving base site contains less errors than do the streams of information symbols determined by the non-serving base sites, time of arrival estimates based on the stream of information symbols as determined by the serving base site are also likely to be more accurate than if they had been based on streams of information symbols as determined by the non-serving base sites, thereby rendering a location determined based on the time of arrival estimates as also being more accurate when only the stream of information symbols as determined by the serving base site is used. Based on computer simulations, the preferred embodiment of the present invention can determine location of a mobile communication unit to within 125 meters of the unit's actual location at least 67% of the time.

In a similar manner, the present invention, in an alternative embodiment, employs the serving base site to convey the received information signal and the stream of information symbols contained in the information signal directly to the location processing device, while the non-serving base sites convey only their respective received information signals. In this embodiment, the location processing device performs some of the functions of the serving and non-serving base sites in the preferred embodiment by computing the times of arrival from the information provided by the base sites. However, as in the preferred embodiment, the time of arrival determinations are based solely on the received information signals and the stream of information symbols as determined by the serving base site to assure greater accuracy in the location that is determined based on the times of arrival.

While the present invention has been particularly shown and described with reference to particular embodiments thereof, it will be understood by those skilled in the art that various changes in form and details may be made therein without departing from the spirit and scope of the present invention.

We claim:

1. A method for locating a mobile communication unit in a communication system, the method comprising the steps of:

receiving, at a first base site and at least a second base site, an information signal transmitted by a first communication unit and a calibration signal transmitted by a second communication unit, the second communication unit being located at a known location;

determining, by the first base site, first timing information based at least on the information signal received at the first base site;

determining, by the first base site, first calibration information based on the calibration signal received at the first base site;

determining, by the at least a second base site, at least second timing information based at least on the information signal received at the at least a second base site;

determining, by the at least a second base site, at least second calibration information based on the calibration signal received at the at least s second base site; and determining a location of the first communication unit based on the first timing information, the at least second timing information, the first calibration information, and the at least second calibration information.

2. The method of claim 1, wherein the second communication unit comprises a stationary communication unit.

3. The method of claim 1, further comprising the steps of:

conveying, by the first base site, the first timing information and the first calibration information to a location processing device; and conveying, by the at least a second base site, the at least second timing information and the at least second calibration information to the location processing device;

and wherein the step of determining a location of the first communication unit comprises the step of determining, by the location processing device, a location of the first communication unit based on the first timing information, the at least second timing information, the first calibration information, and the at least second calibration information.

4. The method of claim 1, wherein the communication system comprises a time division multiple access communication system.

5. The method of claim 1, wherein the step of determining a location of the first communication unit comprises the steps of:

performing a weighted least squares analysis on at least the first timing information, the at least second timing information, the first calibration information, the at least second calibration information, a location of the first base site, and a location of the at least a second base site; and determining the location of the first communication unit as a solution to the weighted least squares analysis.

6. The method of claim 1, wherein the step of conveying comprises the step of conveying the stream of information symbols to the at least a second base site via a T1 communication link, a fiber optic communication link, a microwave communication link, or a wireline communication link.

7. The method of claim 1, wherein the information signal is a quadrature amplitude modulated signal.

8. The method of claim 1, wherein each of the first timing information and the at least second timing information comprises a time of arrival of the information signal.

9. A method for locating a communication unit in a communication system, the method comprising the steps of:

receiving, at each base site of a plurality of base sites, an information signal that conveys a stream of information symbols from the communication unit, wherein the stream of information symbols is unknown to the receiving base site since the stream of information symbols is not a pre-determined stream of information symbols;

determining, at a first base site of the plurality of base sites, the stream of information symbols conveyed by the information signal received at the first base site, deriving the stream of information symbols from the information signal received at the first base site, thereby making the stream of information symbols known to the first base site;

conveying, by each base site, the information signal received to a processing device;

conveying, by the first base site, the stream of information symbols to the processing device;

determining, by the processing device, timing information with respect to each base site based on the stream of information symbols and the information signal received by each base site; and determining, by the processing device, a location of the communication unit based at least on the timing information.

10. The method of claim 9, wherein the step of determining a location of the communication unit comprises the steps of:

performing a weighted least squares analysis on the timing information with respect to each base site and a location of each base site; and determining the location of the communication unit as a solution to the weighted least squares analysis.

11. The method of claim 9, wherein the processing device resides within one of the plurality of base sites.

12. The method of claim 9, wherein the timing information with respect to each base site comprises a time of arrival of the information signal.

13. A method for a processing device to locate a communication unit in a communication system, the method comprising the steps of:

receiving a plurality of information signals from a plurality of base sites, a first information signal of the plurality of information signals being received from the communication unit by a first base site of the plurality of base sites;

receiving a stream of information symbols from the first base site, the stream of information symbols being derived from the first information signal, wherein the stream of information symbols was unknown to the first base site prior to being derived from the first information signal since the stream of information symbols was not a pre-determined stream of information symbols;

determining first timing information based on the stream of information symbols and the information signal received from the first base site;

determining at least second timing information based on the stream of information symbols and the information signal received from at least a second base site of the plurality of base sites; and determining a location of the communication unit based on the first timing information and the at least second timing information.

14. The method of claim 13, wherein the step of determining a location of the communication unit comprises the steps of:

performing a weighted least squares analysis on at least the first timing information, the at least second timing information, a location of the first base site, and a location of the at least a second base site; and determining the location of the communication unit as a solution to the weighted least squares analysis.

15. The method of claim 13, wherein each of the first timing information and the at least second timing information comprises a time of arrival of the information signal.

16. A method for a processing device to determine location of a communication unit in a communication system, the method comprising the steps of:

receiving, from a plurality of base sites, timing information, wherein the timing information is based on an information signal received from the communication unit by each of the plurality of base sites and a stream of information symbols, the stream of information symbols being unknown until derived from the information signal received at a base site of the plurality of base sites that is presently providing communication service to the communication unit since the stream of information symbols was not a pre-determined stream of information symbols; and determining a location of the communication unit based at least on the timing information.

17. The method of claim 16, wherein the step of determining a location of the communication unit comprises the steps of:

performing a weighted least squares analysis on the timing information and a location of each of the plurality of base sites; and determining the location of the communication unit as a solution to the weighted least squares analysis.

18. The method of claim 16, wherein the timing information comprises respective times of arrival of the information signal at the plurality of base sites.

19. An apparatus for use in determining a location of a communication unit in a communication system, the apparatus comprising:

an information signal receiver, coupled to a plurality of base sites, that receives an information signal from each base site of the plurality of base sites, the information signal being originally transmitted to the plurality of base sites from the communication unit;

a symbol stream receiver, coupled to a first base site of the plurality of base sites, that receives a symbol stream from the first base site, the symbol stream being unknown until derived from the information signal received by the first base site since the stream of information symbols is not a pre-determined stream of information symbols; and a time of arrival estimator, coupled to the information signal receiver and the symbol stream receiver, that determines timing information of the information signal with respect to each base site.

20. The apparatus of claim 19, further comprising a location processor, coupled to the time of arrival estimator, that determines a location of the communication unit based on the timing information.

21. The apparatus of claim 19, wherein the apparatus is located within the first base site.

22. The apparatus of claim 19, wherein the apparatus is located within at least a second base site of the plurality of base sites.

23. The apparatus of claim 19, wherein the apparatus is located within a stand-alone location processing device.

24. The method of claim 1, further comprising the steps of:

determining, at the first base site, a stream of information symbols from the information signal received at the first base site; and conveying, by the first base site, the stream of information symbols to the at least a second base site;

wherein the step of determining first timing information comprises the step of determining, at the first base site, first timing information based on the stream of information symbols and the information signal received at the first base site; and wherein the step of determining at least second timing information comprises the step of determining, at the at least a second base site, at least second timing information based on the stream of information symbols received from the first base site and the information signal received at the at least a second base site.

* * * * *